United States Patent [19]

Pai et al.

[11] Patent Number: 5,050,135
[45] Date of Patent: Sep. 17, 1991

[54] MAGNETOSTRICTIVE MULTIPLE POSITION SENSING DEVICE

[75] Inventors: Ramdas M. Pai, Racine; James A. Beck, Franksville, both of Wis.

[73] Assignee: Unico, Inc., Franksville, Wis.

[21] Appl. No.: 453,867

[22] Filed: Dec. 20, 1989

[51] Int. Cl.$^5$ .......................... G01B 17/00; G01B 7/00
[52] U.S. Cl. .................................. 367/127; 324/207.24
[58] Field of Search .................. 324/207.24; 73/597, 73/432.1; 367/127

[56] References Cited

U.S. PATENT DOCUMENTS

| | | | |
|---|---|---|---|
| 3,121,955 | 2/1964 | King | 72/597 X |
| 4,204,333 | 5/1980 | van Blerk | 33/288 |
| 4,224,603 | 9/1980 | Lallemand | 340/347 P |
| 4,238,844 | 12/1980 | Ueda et al. | 367/117 |
| 4,298,772 | 11/1981 | Kobayashi et al. | 324/262 X |
| 4,319,189 | 3/1982 | Cullum, Jr. et al. | 324/208 |
| 4,341,995 | 7/1982 | Henric | 324/161 |
| 4,413,892 | 11/1983 | Lambeth | 73/DIG. 2 |
| 4,631,520 | 12/1986 | Wingate | 340/347 CC |
| 4,634,973 | 1/1987 | Murakami et al. | 324/207 |
| 4,654,590 | 3/1987 | Kitmura et al. | 324/208 |
| 4,658,373 | 4/1987 | Murakami et al. | 264/557 |
| 4,673,827 | 6/1987 | Sommer | 307/116 |
| 4,678,993 | 7/1987 | Vlanemann et al. | 324/208 |
| 4,696,192 | 9/1987 | Yamashita et al. | 73/728 |
| 4,709,209 | 11/1987 | Murakami et al. | 324/207 |
| 4,709,210 | 11/1987 | Pond | 367/127 X |

FOREIGN PATENT DOCUMENTS

| | | | |
|---|---|---|---|
| 199918 | 12/1982 | Japan. | |
| 104549 | 6/1984 | Japan. | |
| 502324 | 7/1976 | U.S.S.R. | 73/597 |
| 1228007 | 4/1986 | U.S.S.R. | 73/597 |

OTHER PUBLICATIONS

*Patent Abstracts of Japan;* Grp. p. 306; vol. 8, No. 219, Abs Pub. Date Oct. 5, 1984 (59-104549).
*Patent Abstracts of Japan;* Grp. p. 179; vol. 7, No. 51, Abs Pub. Date 2/26/1983 (57-199918).

*Primary Examiner*—Tom Noland
*Attorney, Agent, or Firm*—Reinhart, Boerner, Van Deuren, Norris & Rieselbach

[57] ABSTRACT

A position monitoring device for accurately determining a plurality of distances, velocity or acceleration along a line using a plurality of electromagnets. The position monitoring device includes an ultrasound transducer disposed along a line, an ultrasound generator to provide an ultrasound wave pulse along the ultrasound transducer and a plurality of electromagnets disposed along the line at selected positions. The electromagnets generate a magnetic field which interacts with the ultrasound pulse to generate a reflected pulse. A sensor measures the time lapse between generation of the initial pulse and receipt of the reflected pulse, and electronic components convert the time lapse interval to a position measurement.

12 Claims, 2 Drawing Sheets

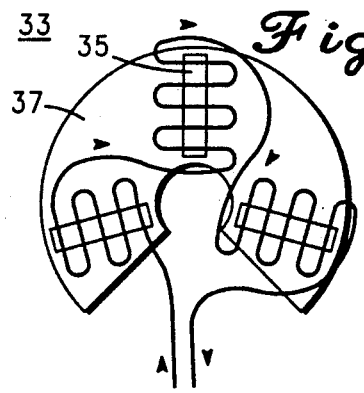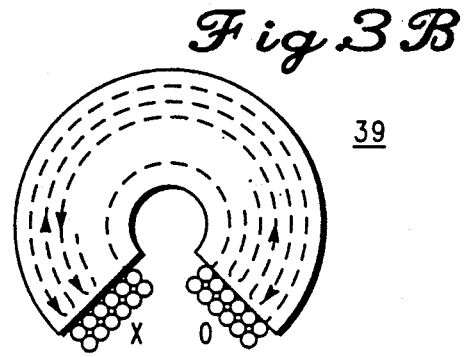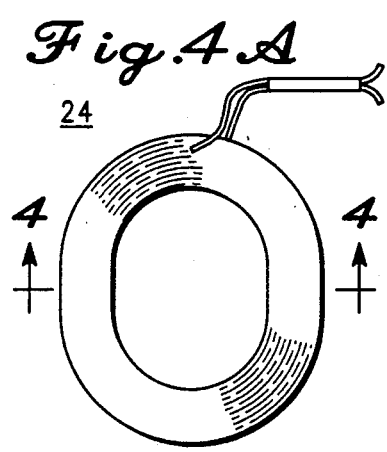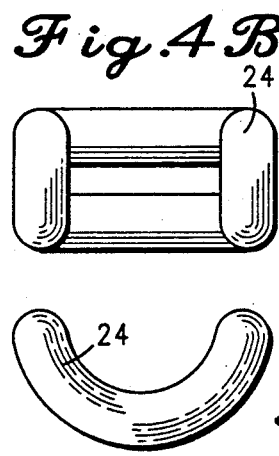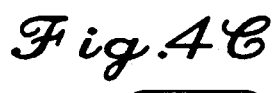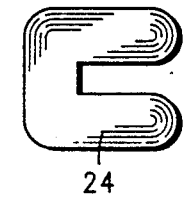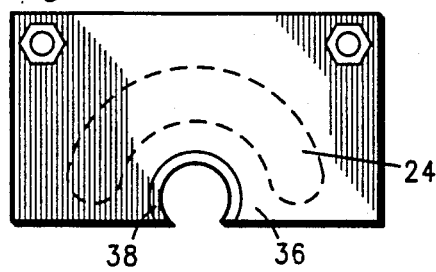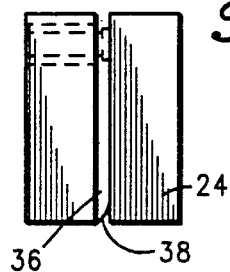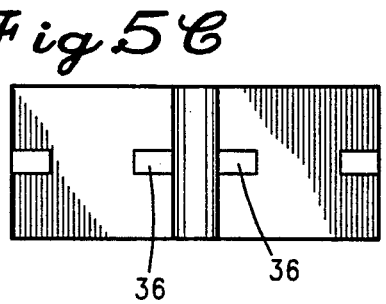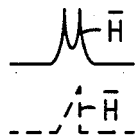

MAGNETOSTRICTIVE MULTIPLE POSITION SENSING DEVICE

The present invention is generally related to a distance measuring or position monitoring device. More particularly, the invention is related to a device for monitoring a plurality of positions along a line using a plurality of electromagnets.

The measurement of distances and precise monitoring of positions are essential functions for numerous commercial applications, such as, operations involving machining, manufacturing and quality control. Linear displacement tranducers using magnetostrictive sensors have been used for a number of years for measuring absolute linear position. Such devices generally perform reasonably well but are limited to the measurement of only one position at a time, and numerous commercial applications either require, or could make good use of, a device for making multiple position measurements in the most convenient manner possible.

It is therefore an object of the invention to provide an improved method and device for making multiple position measurements.

It is another object of the invention to provide a novel device using a plurality of electromagnets for making multiple positions measurements.

It is an additional object of the invention to provide an improved method and apparatus having a fixed or flexible rod with a plurality of electromagnets disposed on the rod for measuring selected positions.

It is yet another object of the invention to provide a novel system for performing multiple position monitoring functions for manufacturing, machining and quality control operations.

It is still a further object of the invention to provide a continuously wound electromagnet mounted for operation as a position locating element of a distance position monitoring device.

It is an additional object of the invention to provide an improved method and device for measuring velocity and differences of velocity of objects along a line.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIGS. 3A and 3B illustrate the construction of several examples of electromagnets useful in the position monitoring device of FIGS. 1 and 2;

FIG. 4A shows an unfolded top view of an electromagnet coil, FIG. 4B illustrates a front elevation view of a folded form of the electromagnet coil of FIG. 4A, FIG. 4C shows a right elevation view of the folded electromagnet coil and FIG. 4D illustrates a top elevation of the folded form of the electromagnet coil; and FIG. 5A. shows a partial transverse cross section through a continuously wound electromagnet having a supporting core element; FIG. 5B illustrates a side view of the electromagnet and core element and FIG. 5C shows a bottom view of the electromagnet.

DETAILED DESCRIPTION OF PREFERRED EMBODIMENT

Figure 1:
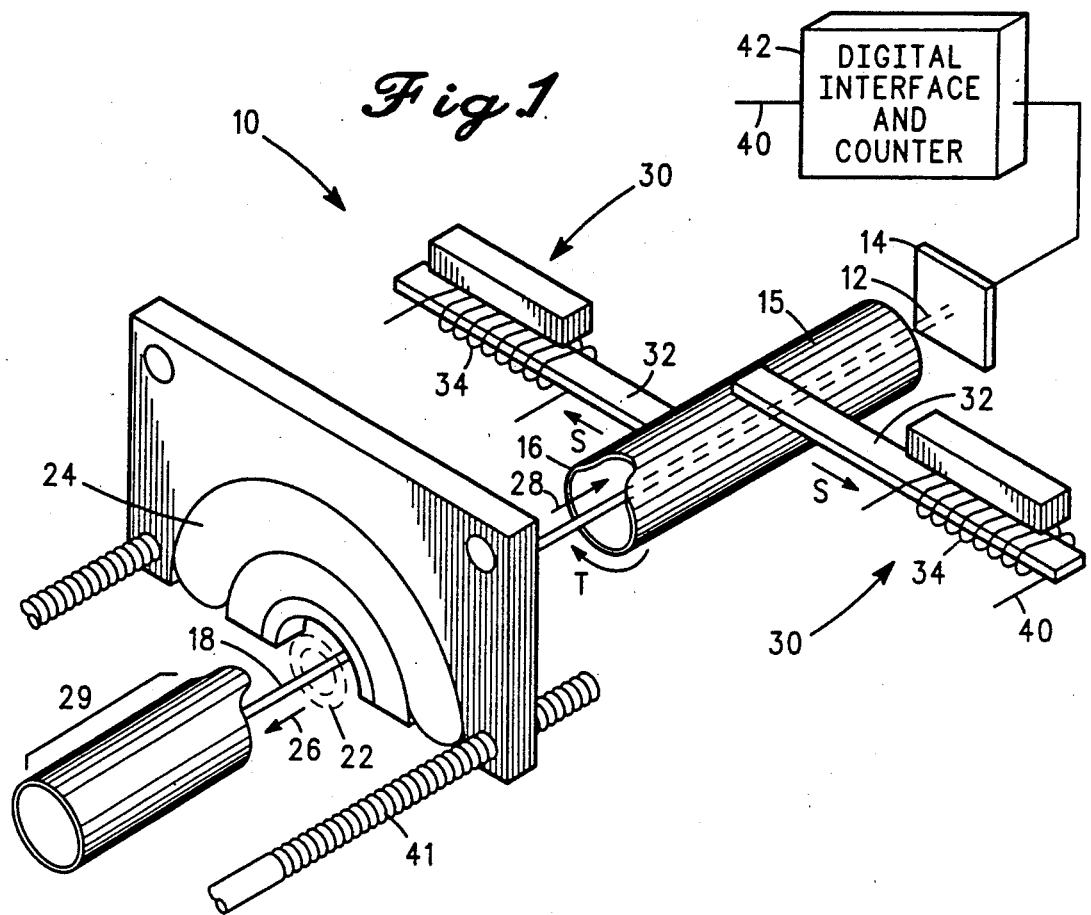
FIG. 1 illustrates a position monitoring device showing one of a plurality of electromagnets used with the invention.

Referring to the drawings and more particularly to FIG. 1, a position monitoring device constructed in accordance with the invention is shown generally at 10. The measurement and monitoring of a plurality of positions along a line is performed by the position monitoring device 10 (hereinafter, the "device 10") using the well developed technology of linear displacement transducers in conjunction with the improvement of the invention. Linear displacement transducers for position and velocity measurements are conventional apparatus available commercially (for example, a model DCTM from Temposonics Incorp., Plainview, N.Y. or Model QUIK-STIK 950CP from Magnetek Controls, Clawson, Mich.). Also, see U.S. Pat. Nos. 4,238,844; 4,298,772; 4,341,995; 4,631,520; 4,654,590; 4,678,993 and 4,709,209 which are incorporated by reference herein.

The basic concept of the linear displacement transducer concerns precise measurement of the positions along a line for use in commercial applications. These measurements are accomplished by determining the time difference interval for an ultrasound interrogation pulse 12 (generated by an oscillator means, such as, a quartz oscillator crystal 14) to travel along an ultrasound transducer 15. The ultrasound transducer includes a nonmagnetic waveguide housing 16 and a conducting element, such as a Ni-Fe wire 18. In particular, the ultrasound interrogation pulse 12 travels along the Ni-Fe wire 18 until the ultrasound interrogation pulse 14 encounters a pinching magnetic field 22 generated by one of a plurality of electromagnet coils 24. Each of the electromagnet coils 24 can be selectively activated and deactivated by the user switching on and off power from supply 25 (D.C. for the circuit shown in FIG. 2). This interaction of the pinching magnetic field 22 with the ultrasound interrogation pulse 12 allows precise monitoring of a plurality of positions, and this interaction will be described hereinafter. Each of the electromagnet coils 24 can also be moved along and coupled to the nonmagnetic waveguide housing 16, allowing the selection of other locations for precise monitoring of position by the device 10.

Figure 2:
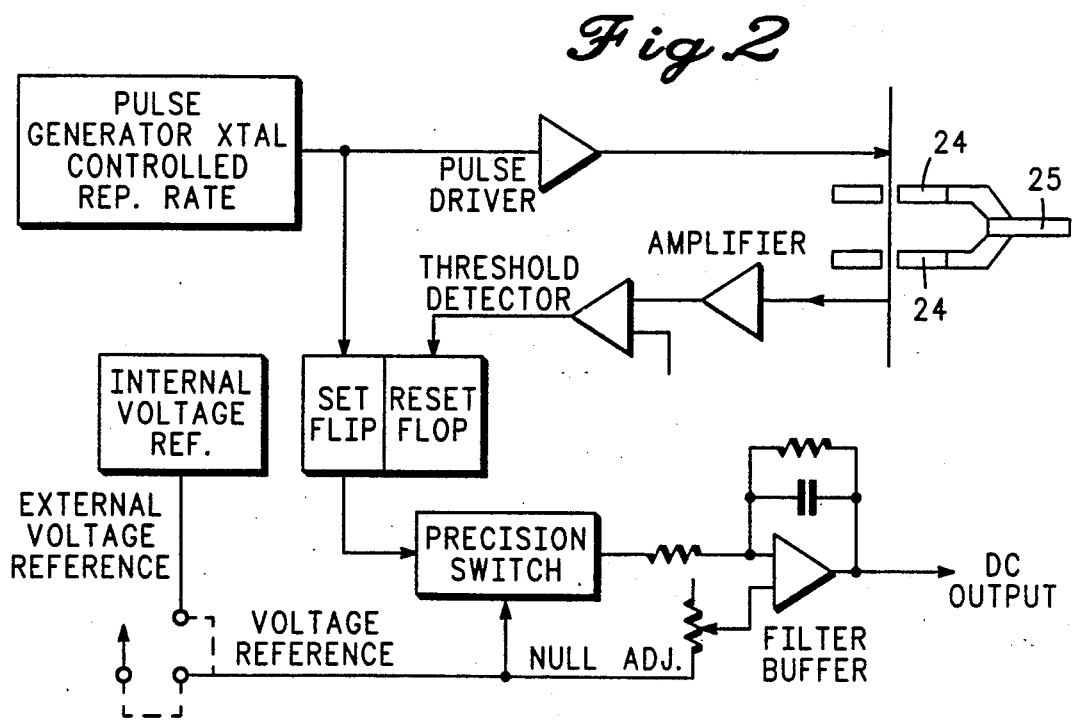
FIG. 2 shows a functional electronic block diagram for a position monitoring device.

The magnetostrictive interaction of the pinching magnetic field 22 with the ultrasound interrogation pulse 12 (the well known Joule effect interaction) causes generation of forward and reflected, or reverse torsional strain pulses 26 and 28, respectively (shown as arrows along the Ni-Fe wire 18). The reflected torsional strain pulse 28 is detected by a sensor 30 by operation of the known Villari effect, wherein the reflected torsional strain pulse 28 is converted to a change of magnetization output through line 40. This output can be converted to an electronic signal which can be related to a measure of position by means for analyzing the previously mentioned time difference interval, such as, a digital interface and counter 42. The nonmagnetic waveguide housing 16 is spring loaded and manifests the Villari effect by undergoing twisting along direction T shown in FIG. 1. The other forwardly transmitted torsional strain pulse 26 is dampened at the end of the ultrasound transducer 15 within a dead zone 29 (about five to seven inches in length in the commercially available linear displacement transducers). The Villari effect detection is accomplished by the sensor 30 by strain sensitive tape 32 responding to the twisting of the waveguide housing 16. The strain sensitive tape 32 moves along direction S shown in FIG. 1, and this movement causes magnetically coupled sensing coil 34 to generate an electrical pulse characteristic of the reflected torsional strain pulse 28. The coil voltage is then amplified by the sensor 30, and is then further operated on by the conventional electronics, such as the digital interface and counter 42 to provide the total time lapse and associated distance measurement. Typical operational electronics of commercial available systems for the linear displacement transducer are shown in FIG. 2, along with a depiction of the plurality of selectively activated electromagnet coils 24. Also, see the previously incorporated U.S. patents for known examples of appropriate electronics.

The electromagnet 24 shown in FIGS. 1, 4 and 5 are preferred embodiments although other forms of electromagnets can also be used to easily measure or monitor a plurality of positions along a line. Shown in FIG. 3A is a representation of an elementary electromagnet design 33 which embodies wire coils wound around highly permeable magnetic cores 35 and embedded in a nonmagnetic material 37, such as bakelite. This concept can be extended to include a continuously wound electromagnet 39 shown in FIG. 3B. Note that the wire windings are in a continuous loop with inner wire layers disposed below and within the outer wire layer loop.

In FIG. 4A is shown the unfolded shape, or starting geometry, for one of the wound electromagnet coils 24. The illustrated unfolded shape can be folded about line 4—4 in FIG. 4A to establish the final form of the folded electromagnet coil 24 shown in FIGS. 4B, C and D. In preparation for use with the device 10, each of the folded electromagnet coils 24 are coupled to a mounting core 36 as shown in FIG. 5. The mounting core 36 functions in part to provide a frame to fixedly couple the folded electromagnet coil 24 onto the nonmagnetic waveguide housing 16. This type of substantial frame enables the position measurement by the device 10 to be reliable and precise. In addition to coupling the folded electromagnet coil 24 to the waveguide housing 16, the mounting core 36 includes a tapered edge portion 38. This tapered edge portion 38 functions to establish a single magnetic field peak shape to avoid a double peak arising from each end of the thickness of the mounting core 36. See, for example, the magnetic field plots shown schematically below FIG. 5B: the magnetic field is shown both with the tapered edge portion 38 (dashed-line) and without the tapered edge portion 38 (full line). The single magnetic peak arising from the ramp shape of the tapered edge portion 38 thus provides a more precise indicator of the position being monitored by the interaction of the magnetic field with the ultrasound interrogation pulse 12.

In other forms of the invention, the electromagnet coil 24 and the mounting core 36 can be moved along the ultrasound transducer 15 by conventional drive means (such as, a worm gear/rod connection 41 shown in FIG. 1), enabling determination of the velocities and relative velocities by measuring time lapse for two positions along the waveguide housing 16. In addition, acceleration can also be determined from measuring velocity at two positions.

The device 10 therefore exhibits substantial advantages arising from the ability to monitor a plurality of positions along a line. In a system using conventional permanent magnets, the field cannot be easily deactivated, and typically, such a system necessitates moving a single permanent magnet to a new position for each measurement, or requires additional mechanical equipment or tedious manual intervention to temporarily remove the permanent magnet from the waveguide housing 16. When using permanent magnets one thus must clear a path for the ultrasound interrogation pulse 12 to travel along the Ni-Fe wire 18 to interact with the field of a more distantly positioned permanent magnet and determine that position by virtue of the magnetic field ultrasound pulse interaction.

The invention consequently has numerous applications including, for example, (1) the setting of cutting head positions for material slitting machinery, such as, sheet steel and paper slitting machines, (2) setting saw head positions for multiple bend saw and lumber milling operations, (3) performing multiple caliper measurements, (4) adjusting and setting multiple welding heads for robotics manufacturing operations, (5) positioning of multi-action presses having more than one ram associated with an axis, (6) establishing take-off and on-loading positions for complex conveyor positions and (7) detecting the positions for various multiple fluid layers, such as in petroleum distillation towers. As mentioned hereinbefore, velocities and acclerations can also be measured as needed in these operating environments.

While preferred embodiments of the present invention have been illustrated and described, it will be understood that changes and modifications may be made therein without departing from the invention in its broader aspect. Various features of the invention are defined in the following claims.

What is claimed is:

1. A position monitoring device, comprising:
an ultrasound transducer disposed along a line;
means for generating an ultrasound interrogation pulse along said ultrasound transducer;
a plurality of electromagnets disposed along said line of said ultrasound transducer, each of said electromagnets selectively actuated for generating a magnetic field for interacting with said ultrasound interrogation pulse and causing generation of a reflected torsional strain pulse and twisting of said ultrasound transducer;
sensor means for detecting the arrival of said reflected torsional strain pulse;
means for determining a time difference interval between generation of said ultrasound interrogation wave and the arrival of said reflected torsional strain pulse; and
means for converting said time difference interval into a position measurement.

2. The position monitoring device as defined in claim 1 wherein each of said plurality of electromagnets comprises a continuously wound electromagnet attached to a mounting fixture coupled to said ultrasound transducer.

3. The position monitoring device as defined in claim 1 wherein said means for generating an ultrasound interrogation wave comprises a quartz crystal oscillator.

4. The position monitoring device as defined in claim 1 further including a mounting fixture for each of said electromagnets wherein each of said mounting fixtures includes a tapered edge portion adjacent the region of coupling to said ultrasound transducer and providing a substantially single magnetic pinch field for sensing position.

5. The position monitoring device as defined in claim 1 wherein said sensor means comprises a strain sensing means attached to said ultrasound waveguide and magnet sensing coils coupled to said strain sensing means.

6. A device for monitoring a plurality of positions along a line, comprising:

an ultrasound waveguide including a nonmagnetic waveguide housing and a conducting element;

means for generating an ultrasound interrogation pulse along said conducting element;

a plurality of electromagnets disposed along the line of said ultrasound waveguide housing and removably coupled thereto, each of said electromagnets selectively activated for generating a magnetic field for interacting with said ultrasound interrogation pulse and causing generation of a reflected torsional strain pulse and twisting of said nonmagnetic waveguide housing;

sensor means for detecting the arrival of said reflected torsional strain pulse;

means for determining a time difference interval between generation of said ultrasound interrogation wave and the arrival of said reflected torsional strain pulse; and means for converting said time difference interval into a position measurement.

7. The device as defined in claim 6 wherein said conducting element comprises a Ni-Fe wire.

8. A position monitoring device, comprising:

an ultrasound transducer disposed along a line;

means for generating an ultrasound interrogation pulse along said ultrasound transducer;

a plurality of electromagnets disposed along said line of said ultrasound transducer, each of said electromagnets selectively actuated for generating a magnetic field for interacting with said ultrasound interrogation pulse and causing generation of a reflected torsional strain pulse and twisting a portion of said ultrasound transducer;

a plurality of electromagnets disposed along said line of said ultrasound transducer, each of said electromagnets including a continuously wound coil mounted on a coil core having a beveled single edge disposed adjacent the exterior housing of said ultrasound transducer and each of said electromagnets selectively activated for generating a magnetic field having substantially one magnetic field peak for interacting with said ultrasound interrogation pulse and causing generation of a reflected torsional strain pulse and twisting of said ultrasound transducer;

sensor means for detecting the arrival of said reflected torsional strain pulse;

means for determining a time difference interval between generation of said ultrasound interrogation wave and the arrival of said reflected torsional strain pulse; and means for converting said time difference interval into a position measurement.

9. The position monitoring device as defined in claim 8 further including the ability to determine relative velocity of moving ones of said electromagnets.

10. The position monitoring device as defined in claim 9 wherein each of said electromagnets is independently supported for motion along said line of said ultrasound transducer.

11. The position monitoring device as defined in claim 8 wherein said ultrasound transducer comprises a flexible transducer having a variable line path selectable by the user.

12. A method for selectively monitoring and detecting desired positions of a commercial process, comprising the steps of:

positioning an ultrasound transducer along a selected line;

generating an ultrasound interrogation wave along said ultrasound transducer;

disposing a plurality of electromagnets along said line of said ultrasound transducer, activating selectively each of said electromagnets for generating a magnetic field for interacting with said ultrasound interrogation wave and causing generation of a torsional strain pulse and twisting said ultrasound transducer;

detecting the arrival of said torsional strain pulse; and determining a time difference interval between generation of said ultrasound interrogation wave and the arrival of said torsional strain pulse.

* * * * *